United States Patent [19]
Cutler, Jr

[11] Patent Number: 5,440,562
[45] Date of Patent: Aug. 8, 1995

[54] COMMUNICATION THROUGH A CHANNEL HAVING A VARIABLE PROPAGATION DELAY

[75] Inventor: Victor H. Cutler, Jr, Mesa, Ariz.

[73] Assignee: Motorola, Inc., Schaumburg, Ill.

[21] Appl. No.: 172,989

[22] Filed: Dec. 27, 1993

[51] Int. Cl.$^6$ .............................................. H04J 3/06
[52] U.S. Cl. ................................... 307/108; 370/95.1
[58] Field of Search ...................... 370/108, 109, 95.1, 370/95.360, 94.1, 103, 104.1; 340/825.69; 455/33.1–33.4

[56] References Cited

U.S. PATENT DOCUMENTS

| | | | |
|---|---|---|---|
| 4,346,470 | 8/1982 | Alverez, III et al. | 370/104 |
| 4,607,257 | 8/1986 | Noguchi | 340/825.69 |
| 4,769,815 | 9/1988 | Hinch et al. | 370/94.1 |
| 4,903,257 | 2/1990 | Takeda et al. | 370/109 |
| 5,249,174 | 9/1993 | Itoh | 370/109 |
| 5,276,714 | 1/1994 | Hosi et al. | 370/109 |
| 5,339,186 | 8/1994 | Weverka | 370/109 |

FOREIGN PATENT DOCUMENTS

| | | |
|---|---|---|
| 0028007 | 5/1981 | European Pat. Off. |
| 0035232 | 9/1981 | European Pat. Off. |
| 0237972 | 9/1987 | European Pat. Off. |

OTHER PUBLICATIONS

An article entitled "IRIDIUM System Overview" from Modern Science & Tecnology of Telecommunications, Nov. 1991, by Theresa Wang and Ellen Pickethall.

Primary Examiner—Douglas W. Olms
Assistant Examiner—Dang Ton
Attorney, Agent, or Firm—Gregory J. Gorrie

[57] ABSTRACT

A communication system (10) communicates real time data through a channel (26) that imposes delays of variable duration on signals propagating therethrough. The channel (26) may be established between a fastmoving satellite (14) in an orbit (28) around the earth and a subscriber unit (24) located proximate the earth' surface. The real time data are generated synchronously (124) at the subscriber unit (24) with a TDM frame (40) established by the satellite (14). The data are delayed in a variable delay circuit (68) before transmission through the channel (26). The duration of the delay imposed by the delay circuit (68) varies in response to timing data received from the satellite (14). The timing data describe a changing propagation delay for the channel (26) and changing definitions for TDM time slots (42', 44') Data received at the subscriber unit (24) are delayed in another variable delay circuit (76). Both gradual and abrupt timing characteristics of the channel (26) are absorbed by the variable timing circuits (68, 76).

27 Claims, 6 Drawing Sheets

COMMUNICATION THROUGH A CHANNEL HAVING A VARIABLE PROPAGATION DELAY

CROSS-REFERENCE TO RELATED APPLICATIONS

This application is related to U.S. patent application Ser. No. 909,487, filed on Jul. 6, 1992 now U.S. Pat. No. 5,268,694, titled "Communication System Employing Spectrum Reuse on a Spherical Surface" which is assigned to the same assignee as the present application.

TECHNICAL FIELD OF THE INVENTION

The present invention relates generally to radio communications. More specifically, the present invention relates to systems and methods which communicate real time signals through channels whose timing characteristics vary.

BACKGROUND OF THE INVENTION

A communication system usually has a goal of reducing throughput time for signals communicated between nodes of the system. The system's throughput time represents the time required for a signal detected at an originating node to be delivered to a destination node. When the communication system communicates real time signals, the system's success often depends on minimizing throughput. Real time signals are responsive to, exert control over, or otherwise relate to physical processes, events, or other phenomena as the phenomena are occurring. For example, telecommunication systems communicate real time audio and possibly video signals in analog or digital form. Throughput of real time signals, whether analog or digital, should be minimized so that a normal conversation may take place without uncomfortable delays occurring after a party at one node ceases speaking and before the same party hears a party at another node respond.

Nodes of a communication system may operate either asychronously or synchronously. Asynchronous operation occurs when processes taking place at different nodes proceed timewise independently of one another. Asynchronous operation allows different processes to operate efficiently and generally at relatively low complexity and expense. However, data transferred between the processes are typically slowed by being delayed in buffers, FIFO memories, or the like.

When an asynchronous system configures real time digital data in frames, typically at least one frame of data is buffered between the generation of the data at one node and the receipt of the data at another node. The one or more frame buffer allows a data-generating node to generate a frame's worth of data within a frame's worth of time and allows a data-receiving node to obtain a frame's worth of data within a frame's worth of time. Typically, the data-generating node is free to place its frame's worth of data within the buffer in accordance with it's own schedule, and the data-receiving node is free to obtain its frame of data from the buffer in accordance with it's own schedule, and the two schedules need not be coupled together. However, when there is one or more frames of buffering, the throughput time increases by the duration of at least a frame.

The buffering may be omitted if the nodes of a communication system are allowed to operate synchronously. Synchronous operation occurs when the timing of processes taking place at different nodes is tightly coupled so that a data-generating node produces its data just in time for a data-receiving node to accept the data. On the other hand, synchronous operation is handicapped by equipment complexity and expense due to the need to couple the timing of spatially diverse processes.

When a radio telecommunication system employs nodes located on or near the surface of the earth and nodes located in satellites placed in orbit around the earth, neither asynchronous nor synchronous operations provide adequate solutions to throughput time and equipment complexity problems. And, these problems multiply when orbiting satellite nodes move relative to earth-based nodes. The vast distances over which signals travel in a satellite-based communication system makes the throughput time problem all the more critical and synchronous operation all the more desirable. On the other hand, satellite movement causes propagation delays of signals communicated between the satellite nodes and ground-based nodes to change as a function of time. The variations in propagation delays associated with communication channels between nodes causes synchronous operations to become extremely complex and costly, if not impossible.

Propagation delay variations might possibly be ignored, but ignoring propagation delays may cause drop-outs and/or gaps in a real time data stream where the propagation delay is expanding. Further, ignoring propagation delays may cause a loss of data where the propagation delay is shrinking. Either situation adversely affects the real time physical phenomena to which the real time data stream relates.

SUMMARY OF THE INVENTION

Accordingly, it is an advantage that the present invention provides an improved system and method for communicating signals through channels whose timing characteristics vary.

Another advantage is that the present invention communicates real time signals through a channel whose propagation delay characteristics vary.

Yet another advantage is that the present invention communicates a real time data stream without dropouts, gaps, or repetitions in the data.

Still another advantage is that the present invention operates nodes of a communication system to reduce throughput time delay in communications between the nodes in spite of variations in timing characteristics of the channels between the nodes.

The above and other advantages of the present invention are carried out in one form by a method for communicating through a channel that delays communications conveyed therethrough by a variable duration. The method calls for obtaining timing data which characterize the channel's variable duration. A signal is delayed by a delay-duration that is responsive to the timing data. The delayed signal is then sent through the channel.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

Figure 1:
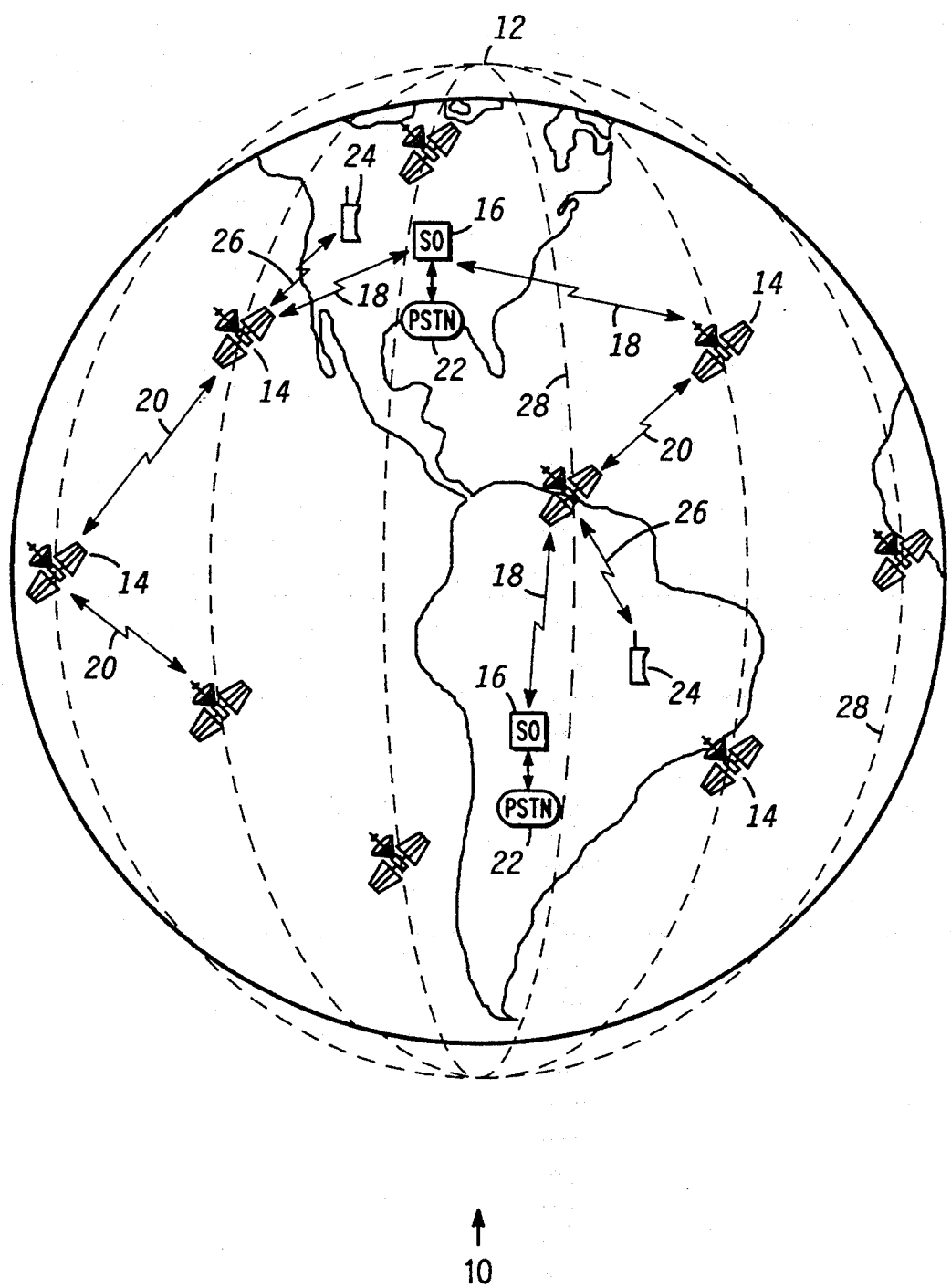
FIG. 1 shows a layout diagram of an environment which supports a cellular communications system within which the present invention may be practiced.

FIG. 1 shows a layout diagram of an environment within which a radio telecommunications system 10 operates. System 10 includes a constellation 12 of several satellites 14 placed in relatively low orbits around the earth. System 10 additionally includes one or more switching offices (SOs) 16. SOs 16 reside on the surface of the earth and are in data communication with nearby ones of satellites 14 through RF communication channels 18. Satellites 14 are also in data communication with one another through data communication channels 20. Hence, through constellation 12 of satellites 14, an SO 16 may control communications delivered to any size region of the earth. However, the region controlled by each SO 16 is preferably associated with one or more specific geo-political jurisdictions, such as one or more countries. SOs 16 couple to public switched telecommunication networks (PSTNs) 22, from which calls directed toward subscribers of system 10 may be received and to which calls placed by subscribers of system 10 may be sent.

System 10 also includes any number, potentially in the millions, of subscriber units (SUs) 24. Sus 24 may be configured as conventional portable radio communication equipment. System 10 accommodates the movement of SUs 24 anywhere on or near the surface of the earth. However, nothing requires SUs 24 to move, and system 10 operates satisfactorily if a portion of the entire population of SUs 24 remains stationary. SUs 24 are configured to engage in communications with satellites 14 over portions of the electromagnetic spectrum that are allocated by governmental agencies associated with various geopolitical jurisdictions. SUs 24 communicate with nearby satellites 14 through communication channels 26.

In general terms, system 10 may be viewed as a network of nodes. Each satellite 14, SO 16, and SU 24 represents a node of system 10. All nodes of system 10 are or may be in data communication with other nodes of system 10 through communication channels 18, 20, and/or 26. In addition, all nodes of system 10 are or may be in data communication with other telephonic devices dispersed throughout the world through PSTNs 22 and/or conventional terrestrial cellular telephone devices coupled to the PSTN through conventional terrestrial base stations.

Communication services, including calls, may be set up between two SUs 24 or between any SU 24 and a PSTN phone number. Generally speaking, each SU 24 engages in control communications with a nearby SO 16 through constellation 12 during a call setup process. These control communications take place prior to forming a communication path between an SU 24 and another unit, which may be another SU 24 or a PSTN phone number.

Due to the configuration of constellation 12, at least one of satellites 14 is desirably within view of each point on the surface of the earth at all times. Due to the low earth orbits, satellites 14 constantly move relative to the earth. In the preferred embodiments, satellites 14 move in orbits at an altitude in the range of 500-1000 km above the earth. If, for example, satellites 14 are placed in orbits which are around 765 km above the earth, then an overhead satellite 14 travels at a speed of around 25,000 km/hr with respect to a point on the surface of the earth. This allows any one satellite 14 to remain above the horizons relative to a point on the surface of the earth for a period of no more than around nine minutes.

Electromagnetic signals traveling at or near the speed of light between an earth-based node, such as an SU 24 or an SO 16, and a satellite communication node 14 propagate between nodes for a finite duration. With satellites 14 placed in the above-discussed orbits, this finite propagation duration has a minimum period of around 2 msec and a maximum period of around 12 msec. The propagation duration changes as satellite 14 moves. The minimum period occurs when a satellite 14 is directly overhead and the maximum period occurs when a satellite 14 is near the horizon. Thus, within the nine minute period for which a satellite is within view of an earth-based node 16 or 24, the duration of signal propagation delay associated with a channel 18 or 26 may decrease approximately 10 msec from the 12 msec maximum period to the 2 msec minimum period. Then, still within this 9 minute period, the duration of the signal propagation delay may increase approximately 10 msec from the minimum period back to the maximum period.

With respect to one another, satellites 14 remain relatively stationary, except for orbits 28 converging and crossing over or intersecting each other, perhaps in the polar regions as shown in FIG. 1. Due to this movement, the distances between satellites 14 that reside in adjacent orbits 28 vary with the latitudes of the satellites 14. The greatest distance between satellites 14 placed in adjacent orbits 28 exists at the equator. This distance decreases as adjacent-plane satellites 14 approach the polar regions and increases as adjacent-plane satellites 14 approach the equator.

Figure 2:
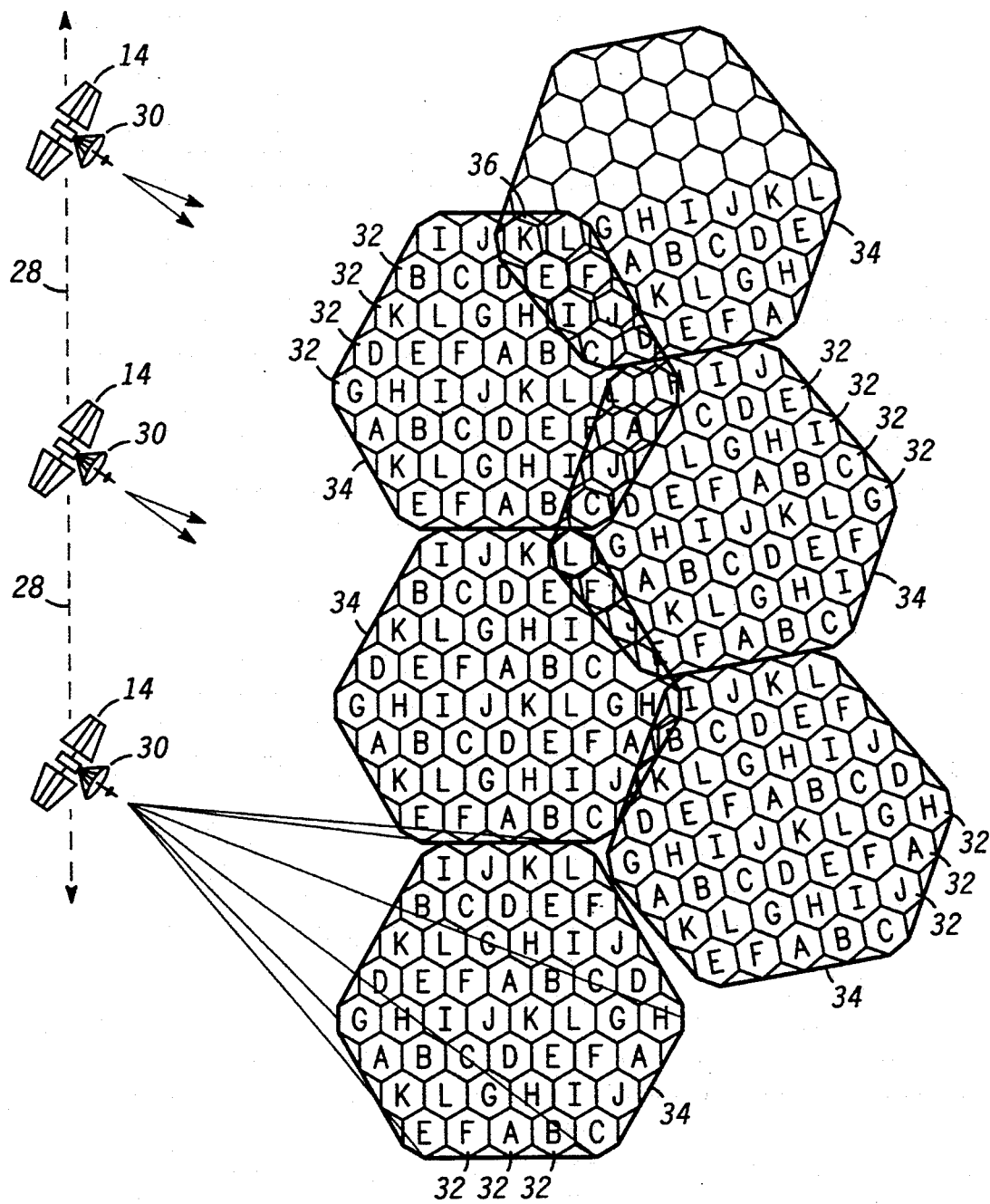
FIG. 2 graphically depicts relative orientations between footprints of cells which may be generated by the system.

FIG. 2 shows a static layout diagram of an exemplary cellular antenna pattern achieved by six of satellites 14, wherein three of the six satellites 14 are sequentially positioned in one orbit 28 of constellation 12 (see FIG. 1) and another three of the six satellites 14 are sequentially positioned in an adjacent orbit (not shown) of constellation 12. For clarity, FIG. 2 depicts only the first three of these six satellites 14.

Each satellite 14 includes an array of directional antennas 30. Each antenna array 30 projects numerous discrete antenna patterns or beams toward the earth's surface at numerous diverse angles away from its satellite 14. FIG. 2 shows a schematic diagram of a resulting pattern of beams 32 that satellites 14 collectively form on the surface of the earth. The pattern of beams 32 which a single satellite 14 projects on the earth's surface is referred to as a footprint 34. FIG. 2 depicts footprints 34 as each having forty-eight of beams 32. However, the precise number of beams 32 included in a footprint 34 is unimportant for the purposes of the present invention.

The pattern formed on the earth by an individual antenna beam is often referred to as a "cell". Thus, the antenna pattern footprint is described as being made up of multiple cells 32.

For convenience, FIG. 2 illustrates cells 32 and footprint 34 as being discrete, generally hexagonal shapes without overlap or gaps. However, those skilled in the art will understand that equal strength lines projected from the antennas of satellites 14 may actually have a shape far different than a hexagonal shape, that antenna side lobes may distort the pattern, that some cells 32 may cover larger areas than other cells 32, and that some overlap between adjacent cells may be expected.

Constellation 12 of satellites 14 communicates with all of SUs 24 (see FIG. 1) and SOs 16 using a limited amount of the electromagnetic spectrum. With respect to the portion of the spectrum allocated to communicating with SUs 24, the present invention divides this spectrum into discrete portions, hereinafter referred to as "reuse units". Reuse units are discussed in more detail below in connection with FIG. 3, but reuse units may be generally viewed as communication channels. Satellites 14 transmit/receive signals to/from active cells 32 using sets of reuse units assigned to the respective active cells 32. In the preferred embodiments of the present invention, this spectrum is divided into discrete time slots and discrete frequency bands. Desirably, each reuse unit set is orthogonal to all other reuse unit sets. In other words, simultaneous communications may take place at a common location over every reuse unit of every reuse unit set without significant interference. As is conventional in cellular communication systems, the reuse unit sets, or communication channels, are assigned to cells through a reuse scheme which prevents adjacent cells from using the same reuse units. However, common reuse units are reused in cells 32 which are spaced apart to efficiently utilize the allocated spectrum.

The precise number of reuse unit sets into which the spectrum is divided is not important to the present invention. FIG. 2 illustrates an exemplary assignment of twelve discrete reuse unit sets to active cells 32. FIG. 2 references the twelve discrete reuse unit sets through the use of the characters "A", "B", "C", "D", "E", "F", "G", "H", "I", "J", "K", and "L". Those skilled in the art will appreciate that a different number of reuse unit sets may be used and that, if a different number is used, the resulting assignment pattern of reuse unit sets to active cells 32 will differ from the assignment pattern depicted in FIG. 2. Likewise, those skilled in the art will appreciate that each reuse unit set may include one reuse unit or any number of orthogonal reuse units therein, and that nothing requires different reuse unit sets to include the same number of reuse units therein.

When orbits 28 cause satellites 14 to remain within view for a predetermined time (e.g., around nine minutes), as discussed above, footprints 34 likewise move over given points on the surface of the earth in about the same time. Due to the movement of footprints 34, system 10 may expect to handoff an extensive number of calls for which communications are being exchanged between SUs 24 and satellites 14. The handoffs will transfer communications from one cell 32 to another cell 32 by changing reuse unit assignments used by the call. The receiving cell 32 may or may not reside in the same footprint 34 as the handing off cell 32. The average call will experience at least one and quite possibly many more handoffs.

FIG. 2 further illustrates an overlap 36 which results from the above-discussed convergence of orbits 28. The size of overlap 36 varies in response to the location of the overlapping footprints 34. As can be determined by reference to FIGS. 1 and 2, the greatest amount of overlap 36 occurs in the polar regions of the earth, while little or no overlap occurs in the equatorial regions of the earth. FIG. 2 represents a static snap-shot of footprints 34. The portion of overlap 36 which is associated with any two adjacent-plane footprints 34 changes as satellites 14 move within orbits 28.

System 10 defines each cell 32 generated from the operation of constellation 12 of satellites 14 as being either active or inactive. Active cells 32 may be viewed as being turned "on" while inactive cells may be viewed as being turned "off" or shut down. Inactive cells 32 reside in overlap region 36, and cells 32 are dynamically switched between active and inactive states as satellites 14 orbit the earth. Satellites 14 refrain from broadcasting transmissions within inactive cells 32, and any signals received at satellites 14 from inactive cells 32 are ignored. Only a portion of cells 32 in overlap region 36 are shut down. Some of cells 32 in overlap region 36 remain active to provide coverage in that region.

The procedures used by system 10 to determine how, when, and where to handoff calls and to determine when and how to switch cells 32 between active and inactive status and which cells 32 require switching are beyond the scope of and not relevant to the present invention. However, when handoffs and cell status switching occurs, control communications are routed to the effected SUs 24. The SUs 24 respond to these control communications by re-tuning their transmitters and receivers to new reuse units as instructed by the control communications. These control communications may occur during ongoing calls.

Figure 3:
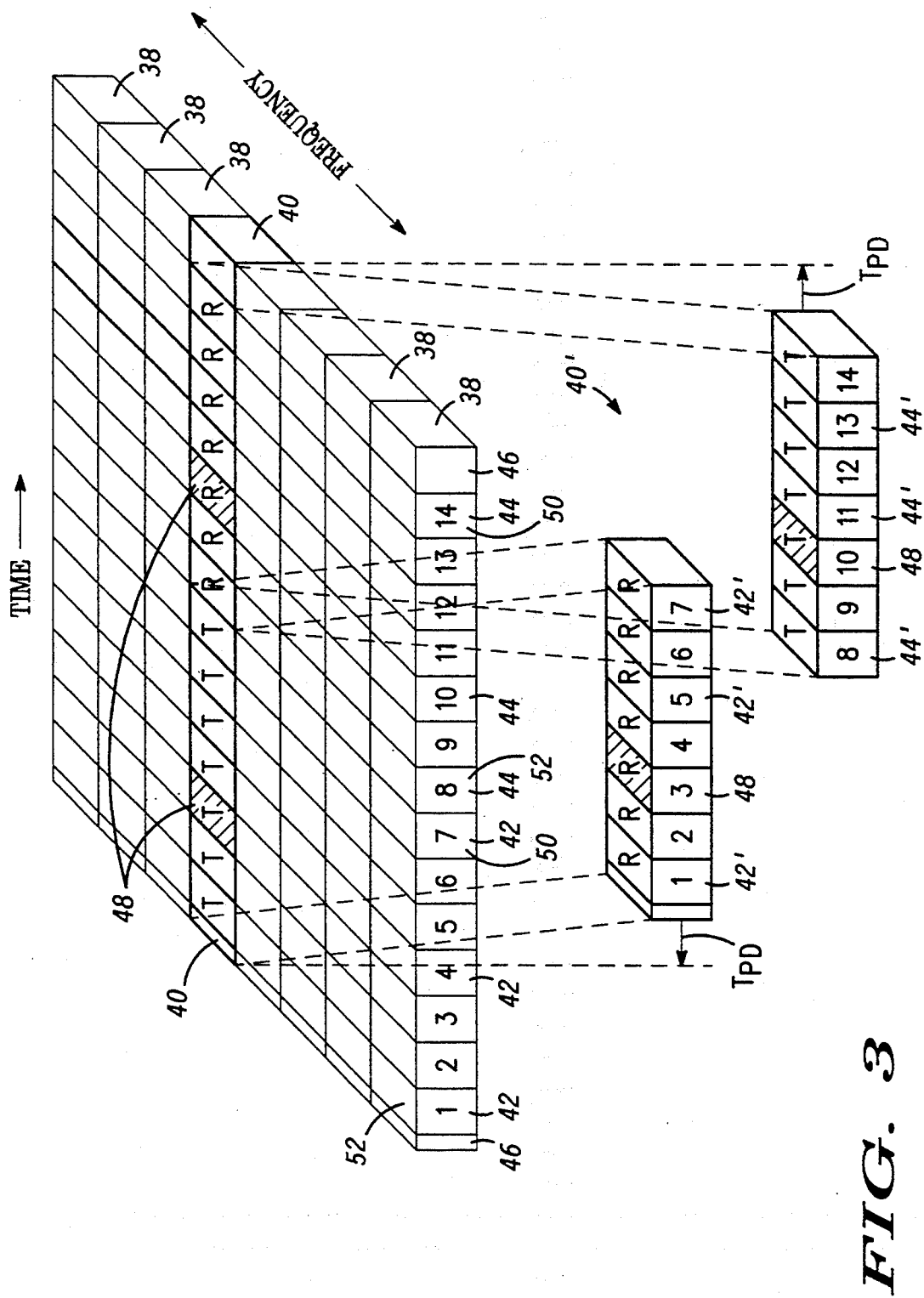
FIG. 3 shows a timing diagram of a Time-Division Multiplexing (TDM) frame format used by one embodiment of the present invention.

FIG. 3 shows a timing diagram of a time division multiplexing (TDM) format used in one embodiment of system 10 to support communications between a satellite node 14 and an SU node 24. As illustrated in the top portion of FIG. 3, the entire electromagnetic spectrum allocated to system 10 for this communication is divided in frequency into any number of frequency channels 38.

In addition, the time over which communications take place between a satellite 14 and a SU 24 is divided into sequentially occurring frames 40, only one of which is shown in FIG. 3. Each frame 40 is divided into diverse transmit time slots 42 and receive time slots 44. The precise timing of timeslots 42 and 44 are defined relative to the timing of frame 40. For example, FIG. 3 assigns transmit time slots 42 the numbers 1–7 and receive time slots 44 the numbers 8–14. Of course, those skilled in the art will appreciate that any number of time slots 42 and 44 may be included in a frame 40, that the number of transmit time slots 42 need not precisely equal the number of receive time slots 44, and that the duration of transmit time slots 42 need not equal the duration of receive time slots 44. Frame 40 may additionally include time slots 46 which may be allocated to other purposes, such as preamble or frame management, signalling, and the like. In a preferred embodiment, time-frame 40 is desirably between 25 and 120 milliseconds and preferably around 90 milliseconds.

A reuse unit 48 represents a particular frequency channel 38 during a single particular pair of transmit and receive time slots 42 and 44. One reuse unit 48 is shown as hatched in FIG. 3. While it may be desirable for transmit and receive time slots 42 and 44 in a reuse unit 48 to reside at a common frequency channel 38, this is not a requirement. The reuse unit's frequency and time assignments may continue indefinitely from frame to frame. Typically, a single reuse unit 48 is assigned to an SU 24 through control communications from a satellite 14, and this reuse unit assignment changes from time to time due to handoffs, satellite antenna beam shut downs, and the like.

The duration of signal propagation delay through channel 26 (see FIG. 1) between a satellite 14 and an SU 24 varies due to two factors. One factor results from movement of satellite 14, which causes the distance between satellite 14 and SU 24 to change. Since satellites 14 orbit the earth at relatively constant speeds and in contiguous predictable orbits, variation in propagation delay occurs gradually due to this factor. A second factor results from reuse unit 48 assignment changes, Where reuse unit 48 changes, time slots 42 and 44 often abruptly change when the new reuse unit assignments take effect.

Frame 40 is desirably configured to minimize the impact of abrupt timing changes that take may place in accordance with reuse unit 48 reassignments. Rather than interleaving transmit time slots 42 with receive time slots 44, transmit time slots 42 are positioned together in a block and receive time slots 44 are positioned together in a block. As a consequence, the abrupt timing change which may result from a reuse unit 48 reassignment is limited to being significantly less than the duration of a frame 40. In fact, when less than $\frac{1}{2}$ of the entire frame's time is devoted to either a transmit or receive function, as illustrated in FIG. 3, the abrupt timing change factor is limited to being less than $\frac{1}{2}$ of a frame. Under these circumstances, the maximum possible amount of abrupt timing change equals the difference or duration between a last-occurring time slot 50 and a first-occurring time slot 52 for respective transmit and receive time slots 42 and 44.

In the preferred embodiments of system 10, the framing and management of the electromagnetic spectrum is desirably controlled by satellites 14. SUs 24 adapt their operations to meet requirements established by satellites 14. Accordingly, SUs 24 utilize a frame 40', which is configured for consistency with frame 40. Transmit time slots 42 become receive time slots 42' when received at SUs 24. Receive time slots 42' occur a propagation delay $T_{PD}$ after their corresponding transmit time slots 42 at satellite 14 due to the propagation delay between satellite 14 and SU 24. As discussed above $T_{PD}$ varies between predetermined minimum and maximum durations due to satellite movement. Likewise, transmit time slots 44' in SU frame 40' correspond to receive time slots 44 in satellite frame 40. Transmit time slots 44' are transmitted or sent from an SU 24 a propagation delay $T_{PD}$ before their corresponding receive time slots 44 in frame 40. Due to $T_{PD}$, the duration between corresponding time slots 44' and 42' at SU 24 is less than the duration between corresponding time slots 44 and 42 at satellite 14 by approximately two times $T_{PD}$.

As an example, for the particular reuse unit 48 which is shaded in FIG. 3, SU 24 accepts data only during time slot "3" of frame 40'. SU 24 therefore defines its frame 40' so that its time slot "3" occurs $T_{PD}$ after time slot "3" at satellite 14. That way, data which are transmitted from satellite 14 arrive just in time to be accepted at SU 24 during its time slot "3". Likewise, satellite 14 accepts data from SU 24 only during time slot "10" of frame 40. SU 24 therefore transmits this data during its time slot "10", and time slot "10" at SU 24 occurs $T_{PD}$ before time slot 10 at satellite 14. This data which is sent prior to the receive time slot 44 assigned to the reuse unit 48 arrives just in time for it to be accepted at satellite 14.

Figure 4:
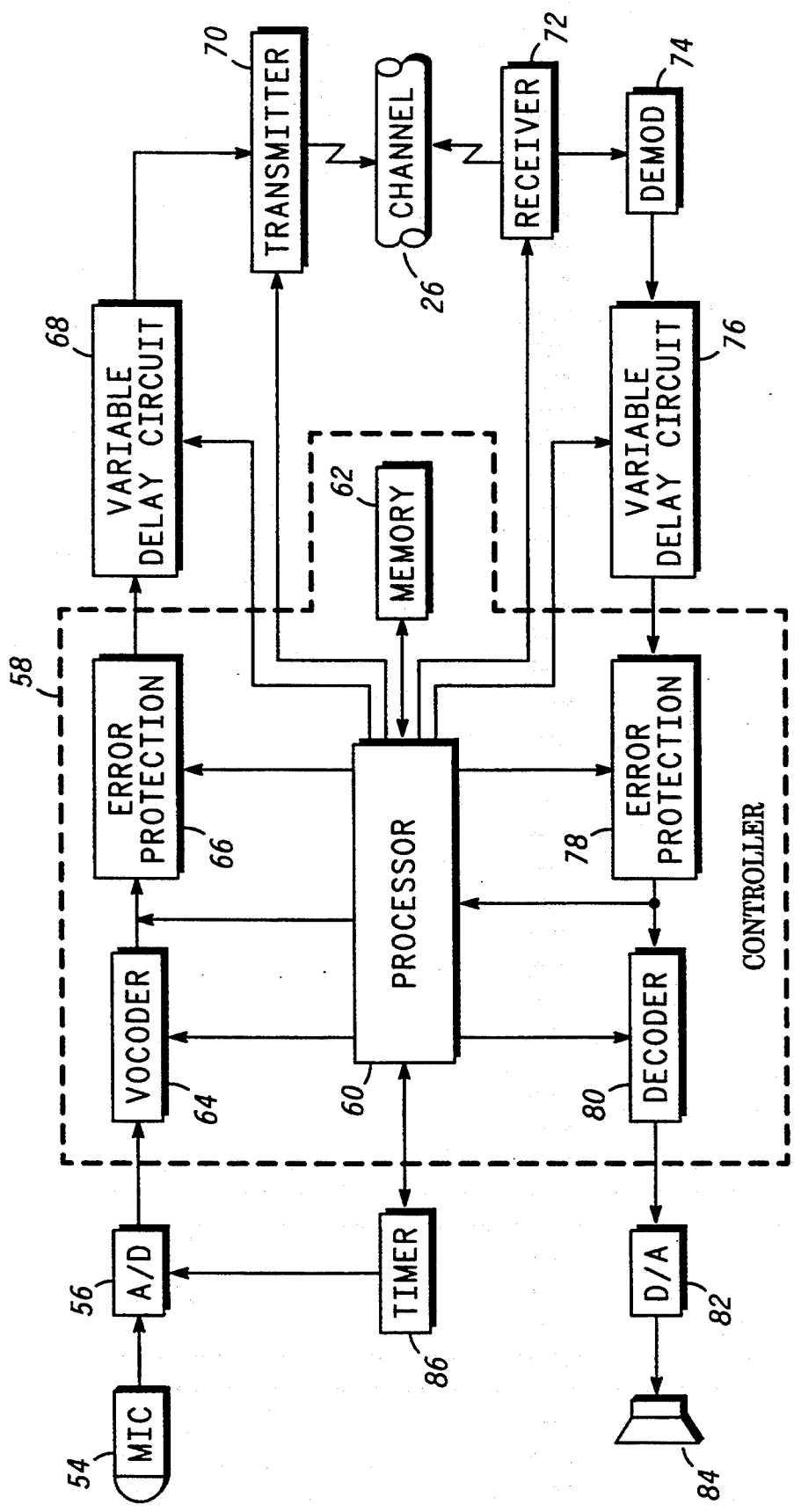
FIG. 4 shows a block diagram of a subscriber unit node which participates in the system.

FIG. 4 shows a block diagram of an earth-based node, such as an SU 24, of system 10. In the embodiment of the present invention in FIG. 4, SU 24 is a telecommunication unit which obtains a real time analog audio signal by monitoring the physical phenomenon of sound, converts the audio signal into a real time digital signal data stream, and transmits the signal data stream to a satellite 14. At that point, system 10 routes the signal data stream to its intended destination. SU 24 receives a real time signal data stream from the destination and system 10 via satellite 14, translates this data stream into a real time audio signal, and transduces the audio signal into the physical phenomenon of sound.

A microphone 54 generates a real time audio signal. Of course, those skilled in the art will understand that alternate embodiments of SU 24 may obtain a real time signal from other sources. An analog to digital (A/D) converter 56 couples to microphone 54 and samples the real time audio signal to produce a stream of digital signal data. A/D 56 preferably samples at a constant sampling rate to reduce the complexity associated with processing the signal data, but this is not essential. A controller 58 has a data input which couples to A/D 56. Controller 58 includes a processor 60 which couples to a memory 62. A vocoder 64 is controlled by processor 60 and receives the signal data from A/D 56. An error protection block 66 is also controlled by processor 60 and receives the signal data from vocoder 64. In addition, any control data produced by processor 60 is combined with the signal data from vocoder 64 at error protection block 66.

An output of error protection block 66, which is also an output of controller 58, couples to a transmit variable delay circuit 68. Delay circuit 68 may be provided by a memory circuit, shift register, buffer, FIFO, or other storage device known to those skilled in the art. Delay circuit 68 has a duration control input which couples to processor 60 of controller 58. Through this input, controller 58 establishes the duration for which delay circuit 68 delays data placed therein by controller 58.

Delay circuit 68 is configured to insert a delay which is related to the propagation delay changes discussed above. Delay circuit 68 may also be configured to insert a delay to compensate for the shifting use of time slots discussed above. In particular, delay circuit 68 imposes a maximum delay equivalent to the maximum change in gradual propagation delay caused by movement of satellite 14 plus the maximum abrupt change caused by reuse unit reassignments. Thus, the maximum delay imposed by delay circuit 68 is less than a frame 40 (see FIG. 3). Of course, the actual delay will have a duration between zero and this maximum delay, as specified by processor 60. An output of delay circuit 68 couples to a transmitter 70, which sends a modulated RF signal into channel 26 for transmission to satellite 14. Processor 60 of controller 58 couples to transmitter 70 to control the reuse units 48 (see FIG. 3) within which transmissions are made.

A receiver 72 couples to channel 26 through an antenna (not shown) to detect signals transmitted by satellite 14. Receiver 72 couples to a demodulator, or demod, 74 which extracts data from the received signals. Receiver 72 also couples to processor 60 so that processor 60 may control the reuse units 48 (see FIG. 3) within which received signals are accepted. Demod 74 couples to a receive variable delay circuit 76. Delay circuit 76 works in an analogous manner to delay circuit 68, discussed above, except that it delays received data rather than data intended for transmission to satellite 14. A duration control input of delay circuit 76 couples to processor 60 of controller 58. Through this input, processor 60 controls the amount of delay imposed on received data passing through delay circuit 76.

A data output from delay circuit 76 couples to controller 58, particularly to an error protection block 78 of controller 58. Error protection block 78 is controlled by processor 60. Received data output from error protection block 78 is split into signal data and control data. The control data are routed to processor 60 while the signal data are fed to a decoder 80, which is also controlled by processor 60. An output of decoder 80 couples to a digital-to-analog (D/A) converter 82, which translates a signal data portion of the received digital data stream into an analog audio signal. D/A 82 couples to a transducer 84, such as a loudspeaker or the like, to translate the analog audio signal into the physical phenomenon of sound.

A timer 86 couples to processor 60 to help processor 60 keep track of time. Timer 86 also conveniently couples to A/D 56 and D/A 82 to control sampling of analog signals and the translating of digital data into analog signals. Although not shown, timer 86 may, in some embodiments, couple directly to delay circuits 68 and 76 to help in delaying data by the amounts specified by processor 60.

In the preferred embodiment of the present invention, vocoder 64 performs a conventional audio compression function to produce a stream of data packets, and decoder 80 performs a complementary expansion function on packets of data. Error protection block 66 encodes the packets of data in a conventional manner to achieve a degree of error detection and correction, and error protection block 78 performs a complementary process to strip error correction data from received packets and correct errors in the packets. While vocoder 64, error protection block 66, error protection block 78, and decoder 80 are shown in FIG. 4 as separate blocks, those skilled in the art will appreciate that their functions may be incorporated within processor 60 in some embodiments of the present invention, or that digital signal processing devices controlled by processor 60 may be adapted to these functions.

Memory 62 includes data which serve as instructions to processor 60 and which, when executed by processor 60, cause SU 24 to carry out processes which are discussed below. In addition, memory 62 includes variables, tables, and databases that are manipulated due to the operation of SU 24. In short, each SU 24 represents a programmable machine which takes on the character assigned to it by software programming located in memory 62 and executed by processor 60.

Those of skill in the art will also understand based on the description herein that while the operation of SU 24 illustrated in FIG. 4 has been described for information in the form of sound, this is not essential, and any other form of analog or digital information may be used for the input/output. Facsimile, video, and computer data are non-limiting examples.

Figure 5:
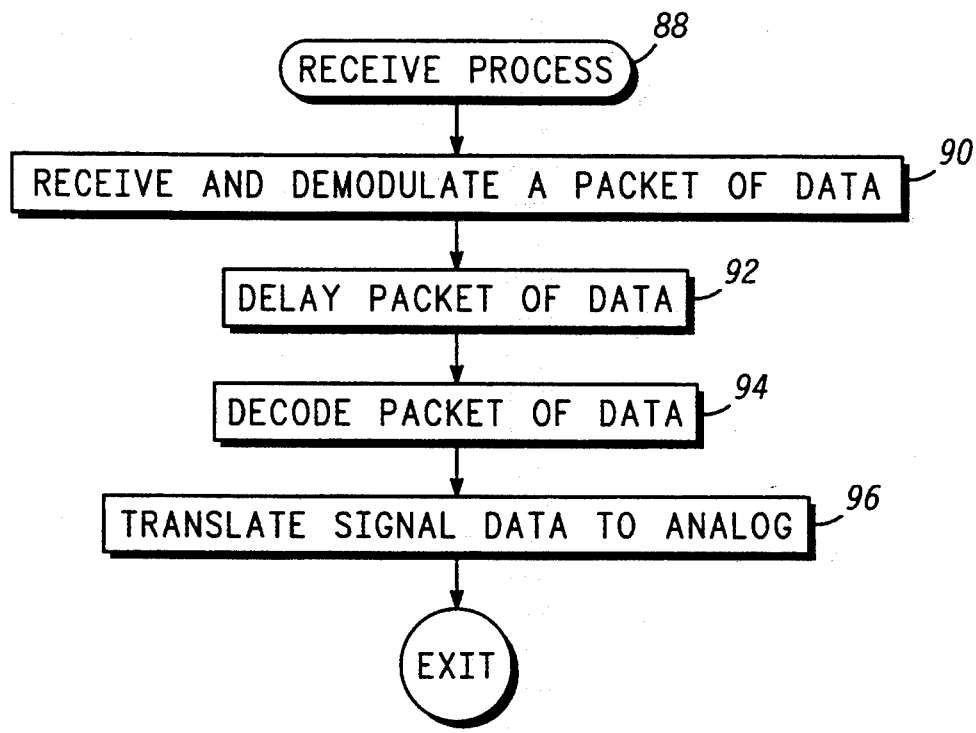
FIG. 5 shows a flow chart of a Receive process performed by the subscriber unit.
Figure 6:
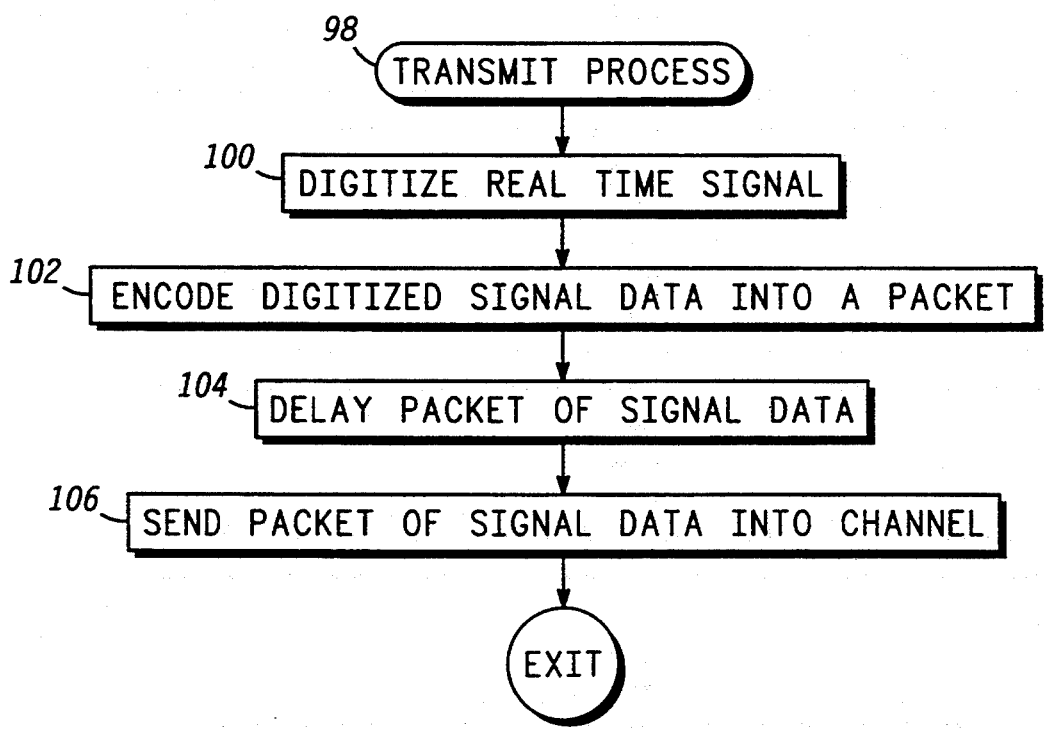
FIG. 6 shows a flow chart of a Transmit process performed by the subscriber unit.
Figure 7:
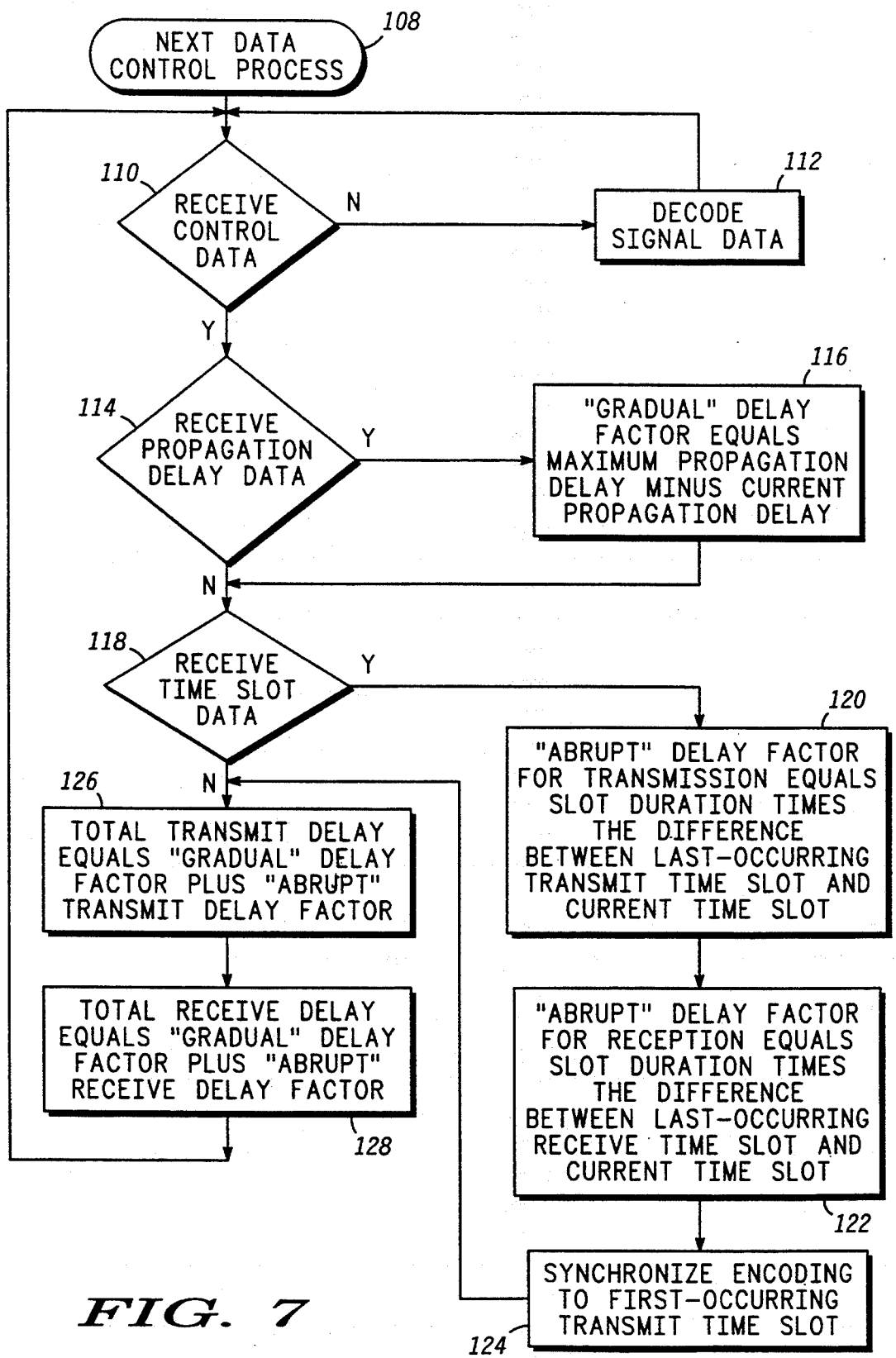
FIG. 7 shows a flow chart of a Next Data Control process performed by the subscriber unit.

FIGS. 5-7 show flow charts of processes performed by SU 24 in support of the present invention. In the preferred embodiments of the present invention, a large number of SUs 24 in system 10 perform substantially the same processes. Thus, FIGS. 5-7 may be viewed as applying to all SUs 24. In addition, those skilled in the art will appreciate that nothing prevents SUs 24 from performing other processes which are not related to the present invention. Furthermore, those skilled in the art will appreciate that nothing requires SUs 24 to performing the steps described in FIGS. 5-7 in any particular order.

For example, FIGS. 5-7 relate to processes which are performed in communicating real time data. In telecommunication terms, these processes are performed once a call has been established. Those skilled in the art will appreciate that SU 24 may first acquire a signal broadcast by a satellite 14 and engage in data communications with system 10 through the satellite 14 to setup a call. In the course of these acquisition and setup communications, SU 24 may receive "timing data" from satellite 14. These timing data inform SU 24 of reuse units 48 (see FIG. 3) assigned to SU 24 for the upcoming call. As discussed above, the definition of a reuse unit 48 includes a definition of a pair of receive and transmit time slots 42' and 44' (see FIG. 4) along with a frequency definition. This reuse unit assignment information is used to control transmitter 70 and receiver 72 (see FIG. 4) in the manner described herein so that communications will be successful.

In addition, the timing data received from satellite 14 defines the period of time required for a signal to propagate through channel 26 (see FIGS. 1 and 4). This definition may, but need not, be a precise definition of the propagation delay. This propagation delay timing data may, for example, simply inform SU 24 of changes to make in its current definitions for its receive and transmit time slots 42' and 44' so that subsequent communications will more closely match timing constraints imposed by frame 40 (see FIG. 3) being managed at satellite 14. The initial acquisition process may simply obtain crude timing accuracy, and a feedback process resulting from communicating with satellite 14 and making changes in accordance with such propagation delay timing data will cause SU 24 and satellite 14 to communicate with one another within tightly controlled timing constraints, like those discussed above in connection with FIG. 3. The accumulation of the timing changes received from satellite 14 will define overall propagation delay.

Moreover, once a call has been setup and real time data are being communicated through channel 26 (see FIGS. 1 and 4), satellite 14 provides a stream of this timing data to SU 24 throughout the duration of the call. This stream of timing data informs SU 24 of timing changes to make in its receive and transmit time slots 42' and 44' to compensate for propagation delay variation caused by the movement in satellite 14. In addition, this stream of timing data informs SU 24 of reuse unit reassignments. Nothing requires this stream of timing data to flow toward SU 24 in a constant manner. Rather, such timing data may be forwarded to SU as needed, and satellite 14 determines the need.

FIG. 5 shows a flow chart of tasks performed by SU 24 during a Receive Process 88. Generally speaking, SU 24 performs process 88 to receive and process real time and control data from a satellite 14. Accordingly, a task 90 receives and demodulates a packet of data. This packet of data may represent the entire amount of data received over the duration of a time slot 42' (see FIG. 3). Task 90 is performed primarily by receiver 72 and demodulator 74 (see FIG. 4).

As task 90 receives and demodulates the packet of data, the data are placed in variable delay circuit 76 (see FIG. 4) and delayed therein, as indicated at a task 92. However, while task 92 delays the data, task 90 continues to receive and demodulate subsequently received data. The duration of the delay is determined by processor 60 (see FIG. 4) in accordance with a process which is discussed below in connection with FIG. 7. In the preferred embodiments, this delay is less than a frame duration. Next, a task 94 decodes the packet of data. However, after each packet of data is delayed by the specified amount, task 92 will repeat for a subsequent packet of data. Error correction procedures are performed by block 78 (see FIG. 4), control data are detected and routed to processor 60, and the remaining signal data are decoded in decoder 80 (see FIG. 4). Desirably, the signal data have been encoded based upon a constant sampling rate to simplify the decoding process. After task 94, packets of data are routed to task 96, where they are translated into analog, as appropriate, and possibly transduced into a physical phenomenon such as sound. Task 96 is performed primarily by D/A 82 and transducer 84.

FIG. 6 shows a flow chart of tasks performed by SU 24 during a Transmit process 98. Generally speaking, SU 24 performs process 98 in transmitting primarily real time data to a satellite 14. Process 98 first generates signal data by digitizing a real time signal, as indicated in a task 100. This task is performed primarily by A/D 56 (see FIG. 4). This sampling desirably takes place at a constant sampling rate so that the encoding and decoding processes may remain as simple, reliable, and inexpensive as possible. When task 100 has sampled a block of data, which may be a frame's worth of data or some smaller portion of data, process 98 performs a task 102. However, task 100 may then repeat for the next block of data.

Task 102 collects one or more blocks of digitized real time signal data from task 100 and encodes these data into a packet. Task 100 is performed primarily by vocoder 64 and error protection block 66 (see FIG. 4). The packet of data may additionally include control data to be transmitted from SU 24 to satellite 14 and system 10. Task 102 then passes its newly formed packet of data onto a task 104. However, process 98 may immediately repeat task 102 to encode one or more subsequent blocks of data.

Task 104 delays the packet of data obtained from task 102 by a duration which is calculated by processor 60 (see FIG. 4) in a manner discussed below in connection with FIG. 7. In the preferred embodiment, this duration is less than a frame duration. Task 104 is performed primarily by variable delay circuit 68 (see FIG. 4). After task 104, a task 106 sends the delayed packet of data into channel 26. Task 106 is performed primarily by transmitter 70 (see FIG. 4).

FIG. 7 shows a flow chart of a Next Data Control process 108 performed by SU 24. Process 108 is performed primarily by processor 60 (see FIG. 4). Process 108 operates in a continuous loop as data are received from satellite 14. When an item of data is encountered, and preferably after error correction has been performed by error protection block 78 (see FIG. 4), process 108 performs a query task 110. The item of data may represent a block of signal data, a control command, or an entire packet of a particular type of data. Task 110 determines whether the item of data is control data. If task 110 determines that the item of data is not control data, then the data item is assumed to be real time signal data, and process 108 performs a task 112. Task 112 decodes the signal data as indicated in task 94 of process 88 (see FIG. 5) by performing tasks which support decoder 80 (see FIG. 4). After task 112, program control returns to task 110.

When task 110 determines that an item of data is control data, then program control proceeds to a query task 114. The above-discussed timing data are control data. Thus, whenever an item of data from the above-discussed stream of timing data are encountered, task 114 is invoked. Task 114 determines whether the control data indicates that SU 24 has received propagation delay data. As discussed above, propagation delay data inform SU 24 of the propagation delay experienced by signals passing through channel 26 (see FIGS. 1 and 4). This propagation delay data may directly indicate propagation delay or may instruct SU 24 to change its definitions for receive and transmit time slots 42' and 44' (see FIG. 3) by a specified increment.

When propagation delay data are detected, a task 116 calculates a "gradual" delay factor. The gradual delay factor is set equal to the predetermined maximum propagation delay associated with channel 26 minus the current propagation delay as indicated by the just-received propagation delay data. Thus, the gradual delay factor equals zero when the maximum possible propagation delay is actually being experienced and equals a maximum amount when the minimum possible propagation delay is actually being experienced. Although not shown, task 116 may also control transmitter 70 and receiver 72 (see FIG. 4) in accordance with the just-received propagation delay data.

After task 116, or when task 114 determines that propagation delay data has not been received, program control proceeds to a query task 118. Task 118 determines whether time slot timing data have been received. Such data may take the form of a reuse unit reassignment. When time slot data are detected, a task 120 calculates an "abrupt" delay factor for the transmission of data. This abrupt factor equals the duration for a transmit time slot 44' times the difference between the last occurring transmit time slot 50 (see FIG. 3) and the current transmit time slot. The current transmit time slot is identified by the just-received time slot data. After task 120, a task 122 calculates an "abrupt" delay factor for the reception of data. This abrupt delay factor equals the duration for a receive time slot 42' times the difference between the last occurring receive time slot 50 (see FIG. 3) and the current receive time slot. The current receive time slot is identified by the just-received time slot data.

After task 122, a task 124 synchronizes the encoding performed by vocoder 64 and error protection block 66 (see FIG. 4) to the first-occurring one of transmit time slots 44'. As discussed above, vocoder 64 and error protection block 66 generate signal data by processing blocks or packets of data. Task 124 defines when the beginning of these blocks or packets should occur. By synchronizing the generation of signal data packets to the first-occurring one of transmit time slots 44', a packet of data is generated by controller 58 (see FIG. 4) just in time so that, after being delayed in variable delay circuit 68 (see FIG. 4) and transmission through channel 26, the packet of data arrives at satellite 14 when receive time slot 44 (see FIG. 3) occurs at satellite 14. This synchronization task allows SU 24 to omit additional data buffering which would degrade data throughput.

After task 124, or when task 118 determines that no time slot data has been received, process 108 performs a task 126. Task 126 calculates the total delay to apply to data intended for transmission. The duration of this transmission delay equals the sum of the gradual delay factor calculated above in task 116 plus the abrupt delay factor calculated above in task 120. Task 126 then adjusts the duration control input of variable delay circuit 68 (see FIG. 4) in accordance with this calculation. Those skilled in the art will appreciate that, as SU 24 encounters the stream of timing data, the duration of delay imposed by variable delay circuit 68 varies in response to the timing data.

Next, a task 128 calculates the total delay to apply to received data. The duration of this receive delay equals the sum of the gradual delay factor calculated above in task 116 plus the abrupt factor calculated above in task 122. Task 128 then adjusts the duration control input of variable delay circuit 76 (see FIG. 4) in accordance with this calculation. Those skilled in the art will appreciate that, as SU 24 encounters the stream of timing data, the duration of delay imposed by variable delay circuit 76 varies in response to the timing data.

After task 128, program control loops back to task 110 to evaluate the next item of data encountered at SU 24. SU 24 indefinitely continues its operations within the programming loop illustrated in FIG. 7.

In summary, the present invention provides an improved system and method for communicating signals through channels whose timing characteristics vary. These signals may convey real time data. The real time data may be sampled or otherwise generated at a constant rate. A real time data stream communicated through a channel with varying timing characteristics is free from drop-outs, gaps, and repetitions because the timing variations are absorbed by variable delay circuits which are programmed to delay data by specified amounts. The present invention operates nodes of a communication system to reduce throughput time delay in communications between the nodes in spite of variations in timing characteristics of the channels between the nodes. Throughput delay is reduced through synchronous operation of processes occurring at different nodes.

The present invention has been described above with reference to preferred embodiments. However, those skilled in the art will recognize that changes and modifications may be made in these preferred embodiments without departing from the scope of the present invention. For example, while the above description focuses on a subscriber unit node of the communication system, with minor adaptations well within the level of skill in the art, the same discussion applies to other ground-based nodes of the system. Likewise, the above discussion focuses upon a variable delay circuit located at subscriber unit nodes of the system. However, those skilled in the art will understand that the variable delay circuit compensates for a characteristic of the channel between nodes and that the variable delay circuit may be installed at either end of the channel. Moreover, while the present invention is particularly useful in connection with the communication of real time data, nothing prevents its use in connection with command, signaling, or other types of data. These and other changes and modifications which are obvious to those skilled in the art are intended to be included within the scope of the present invention.

What is claimed is:

1. A method for communicating through a channel that delays communications conveyed therethrough by a variable duration, said method comprising the steps of:
   receiving timing data which define a propagation time through said channel, said timing data being updated as said propagation time of said channel changes;
   delaying a signal by a delay-duration that is a function of said propagation time;
   changing said delay-duration in response to changes in said propagation time;
   sending said signal through said channel after said delay-duration.

2. A method for communicating through a channel as claimed in claim 1 wherein said timing data comprise a stream of data which track changes in said propagation time, and said delaying step comprises the step of varying said delay-duration in response to said changes in said propagation time.

3. A method for communicating through a channel as claimed in claim 2 wherein said timing data are responsive to changes in a period of time required for said signal to propagate through said channel.

4. A method for communicating through a channel as claimed in claim 2 wherein said timing data additionally define a time slot relative to a time division multiplexing (TDM) frame.

5. A method for communicating through a channel as claimed in claim 4 wherein said delaying step delays said signal by a duration which is less than the duration of said TDM frame and substantially equal to said propagation time minus a largest integer number of said TDM frames.

6. A method for communicating through a channel as claimed in claim 4 wherein:
   said TDM frame includes a plurality of transmit time slots and a plurality of receive time slots; and
   said method additionally comprises the step of configuring said TDM frame so that the duration between a first-occurring transmit time slot and a last-occurring transmit time slot within a single frame is substantially less than the duration of said TDM frame.

7. A method for communicating through a channel as claimed in claim 6 wherein said duration between said first-occurring transmit time slot and said last-occurring transmit time slot is approximately less than or equal to one-half the duration of an entire TDM frame.

8. A method for communicating through a channel as claimed in claim 6 wherein:
   said propagation time varies between predetermined minimum and maximum propagation durations; and
   said delaying step delays said signal by a duration which is less than said predetermined maximum duration, minus said predetermined minimum duration, plus said duration between said last-occurring transmit time slot and said first-occurring transmit time slot.

9. A method for communicating through a channel as claimed in claim 1 additionally comprising the steps of:
   generating said signal at a first node;
   accepting, after said sending step, said signal at a second node, said second node being capable of accepting said signal within a predetermined time slot; and synchronizing said generating and accepting steps so that said signal arrives at said second node just as said second node is capable of accepting said signal.

10. A method for communicating through a channel as claimed in claim 1 wherein said method additionally comprises the step of sampling a real time signal prior to said delaying step so that said signal represents a real time, digital signal, said sampling occurring at a substantially constant sampling rate.

11. A method for communicating through a channel as claimed in claim 1 additionally comprising the steps of:

receiving a second signal from said channel; and delaying said second signal by a second delay-duration that is responsive to said timing data.

12. A method for communicating through a channel as claimed in claim 1 additionally comprising the step of forming said channel by placing a satellite in a moving orbit relative to a point on the surface of the earth and by placing a subscriber unit proximate the earth's surface, said variable duration resulting from a changing propagation time between said satellite and said subscriber unit due to said moving orbit, wherein said channel is a TDM channel having receive and transmit time slots, and wherein said subscriber unit shifts a receive time and a transmit time of said receive and transmit time slots to compensate for said variable duration.

13. A method for coordinating operations at first and second nodes separated by a channel through which communications between said first and second nodes take place and which delays data conveyed therethrough by a variable duration, said method comprising the steps of:

generating signal data at said first node;

delaying said signal data by a delay-duration by delaying a transmit time of a transmit time slot;

transmitting said signal data within said transmit time slot through said channel to said second node, said signal data experiencing a channel delay in passing through said channel, said transmitting step delaying said transmit time of said transmit time slot by said delay-duration, wherein the transmitting step is synchronized so that said signal data arrive at said second node within a receive time slot of said second node; and varying said delay-duration in response to timing data that define said variable duration of said channel delay, said varying step compensating for variations in said variable duration of said channel delay, said variations caused by relative movement between said first and second nodes.

14. A method for coordinating operations at first and second nodes as claimed in claim 13 wherein;

said method additionally comprises the step of obtaining, at said first node, a stream of said timing data which characterize said variable duration of said channel delay and which track variations in said channel delay, said timing data stream being responsive to periods of time required for said channel delay and said timing data stream identifying time slots relative to a time division multiplexing (TDM) frame; and wherein said delay duration of said varying step is responsive to said stream of said timing data.

15. A method for coordinating operations at first and second nodes as claimed in claim 14 wherein:

said TDM frame includes a plurality of transmit time slots and a plurality of receive time slots;

said method additionally comprises the step of configuring said TDM frame so that the duration between a first-occurring transmit time slot and a last-occurring transmit time slot within a single frame is substantially less than the duration of an entire TDM frame, and wherein said delaying step delays said signal data by a duration which is approximately equal to said channel delay minus a largest integer number of TDM frames.

16. A method for coordinating operations at first and second nodes as claimed in claim 15 wherein said duration between said first-occurring transmit time slot and said last-occurring transmit time slot is approximately less than or equal to one-half the duration of said entire TDM frame.

17. A method for coordinating operations at first and second nodes as claimed in claim 15 wherein:

said channel delay varies between predetermined minimum and maximum propagation durations; and said delaying step delays said signal data by a duration which is less than said predetermined maximum duration, minus said predetermined minimum duration, plus said duration between said last-occurring transmit time slot and said first-occurring transmit time slot.

18. A method for coordinating operations at first and second nodes as claimed in claim 13 wherein said generating step comprises the step of sampling a real time signal at a substantially constant sampling rate.

19. A method for coordinating operations at first and second nodes as claimed in claim 13 additionally comprising the steps of:

receiving second signal data from said channel;

delaying said second signal data by a second delay duration; and varying said second delay duration to compensate for variations in duration of said channel delay.

20. A method for coordinating operations at first and second nodes as claimed in claim 13 additionally comprising the step of forming said channel by placing said first node proximate the surface of the earth and by placing said second node in a moving orbit around the earth relative to said first node, said variable duration resulting from a changing signal propagation time between said first node and said second node due to said moving orbit of said second node, wherein said channel is a TDM channel having receive and transmit time slots, and wherein said first node shifts a receive time and a transmit time of said receive and transmit time slots to compensate for said variable duration.

21. A radio-telecommunications node in which real time signal data form a signal data stream which is received from a channel that imposes a delay of variable duration, said radio-telecommunications node comprising:

a receiver for obtaining timing data which define a propagation time through said channel and for obtaining said signal data stream;

a variable delay circuit, coupled to said receiver, for delaying said signal data stream by a delay-duration that is a function of said propagation time, said variable delay circuit having means for changing said delay-duration in response to changes in said propagation time; and means, coupled to said variable delay circuit, for translating said signal data stream into a real time signal after said signal data are delayed in said variable delay circuit.

23. A radio-telecommunications node as claimed in claim 21 wherein:
said timing data comprise a stream of data which track changes in said variable duration of delay imposed by said channel; and
said variable delay circuit is configured to vary said delay-duration in response to said variation in said duration of delay imposed by said channel.

23. A radio-telecommunications node as claimed in claim 21 wherein:
said timing data are responsive to a period of time required for said signal data to propagate through said channel; and
wherein said timing data additionally define a time slot relative to a time division multiplexing (TDM) frame.

24. A radio-telecommunications node as claimed in claim 23 wherein said variable delay circuit is configured to delay said signal data by a duration which is less than the duration of said TDM frame and substantially equal to said propagation time minus a largest integer number of said TDM frames.

25. A radio-telecommunications node as claimed in claim 23 wherein:
said TDM frame includes a plurality of receive time slots and a plurality of transmit time slots, said receive time slots being configured so that the duration between a first-occurring receive time slot and a last-occurring receive time slot within a single TDM frame is substantially less than the duration of an entire TDM frame;
said period of time required for said signal data to propagate through said channel varies between predetermined minimum and maximum propagation durations; and
said variable delay circuit is configured to delay said signal data by a duration which is less than said predetermined maximum duration, minus said predetermined minimum duration, plus said duration between said last-occurring receive time slot and said first-occurring receive time slot.

26. A radio-telecommunications node as claimed in claim 21 additionally comprising:
sampling means for digitizing a real time signal at a substantially constant sampling rate to produce an outgoing signal data stream;
an outgoing variable delay circuit, coupled to said receiver and said sampling means, for delaying said outgoing signal data stream by an outgoing delay-duration that is responsive to said timing data; and
a transmitter, coupled to said outgoing variable delay circuit, for transmitting said outgoing signal data stream through said channel after being delayed in said outgoing variable delay circuit.

27. A radio-telecommunications node as claimed in claim 26 wherein:
said timing data additionally define a time slot relative to a time division multiplexing (TDM) frame;
said node additionally comprises encoding means, coupled between said sampling means and said outgoing variable delay circuit; and
said node additionally comprises synchronizing means, coupled to said encoding means and said receiver, said synchronizing means being configured to synchronize said encoding means to said TDM frame.

* * * * *